June 13, 1967 W. E. RHODES 3,325,614
FLUID PRESSURE REGULATOR SWITCH
Filed May 24, 1965 4 Sheets-Sheet 1
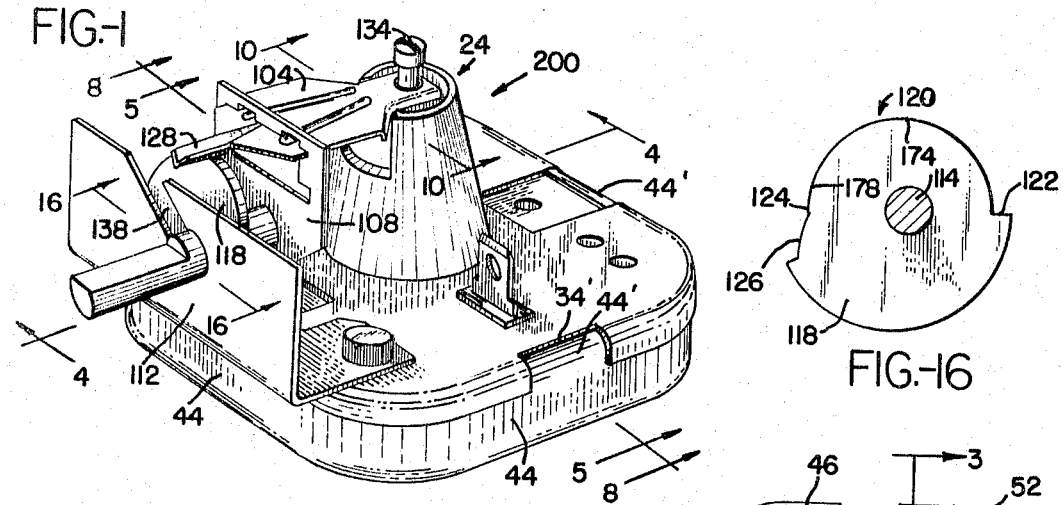
INVENTOR.
WILLIAM E. RHODES
BY
Cauder & Cauder
HIS ATTORNEYS June 13, 1967 W. E. RHODES 3,325,614
FLUID PRESSURE REGULATOR SWITCH
Filed May 24, 1965 4 Sheets-Sheet 2
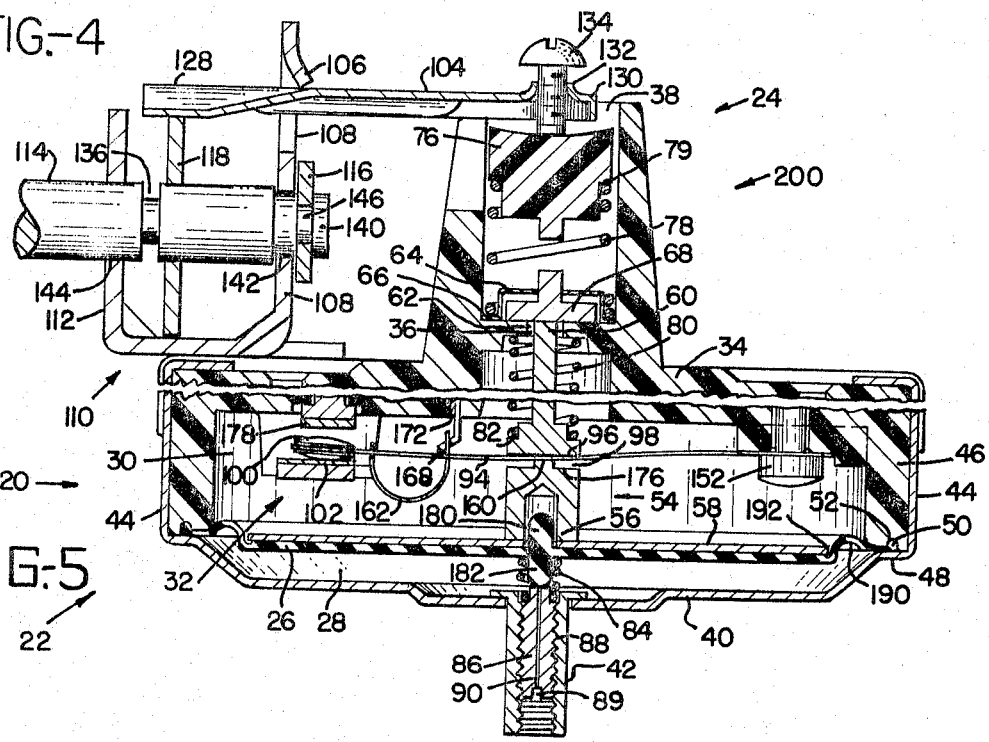
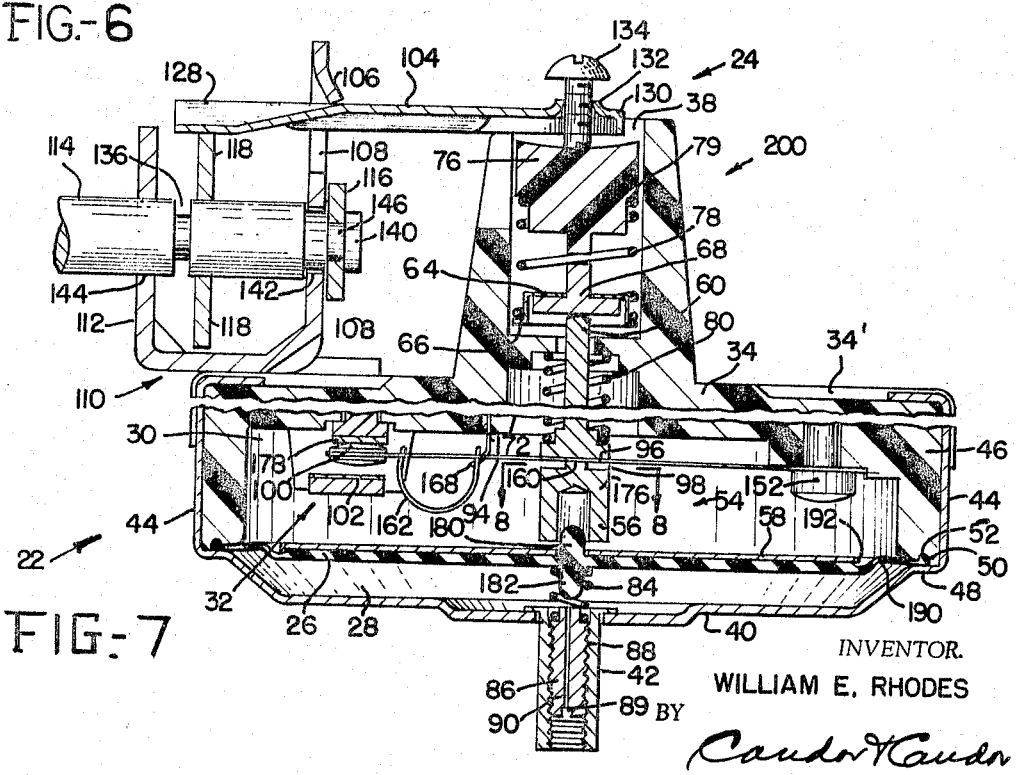
INVENTOR.
WILLIAM E. RHODES
BY Caudor & Caudor
HIS ATTORNEYS

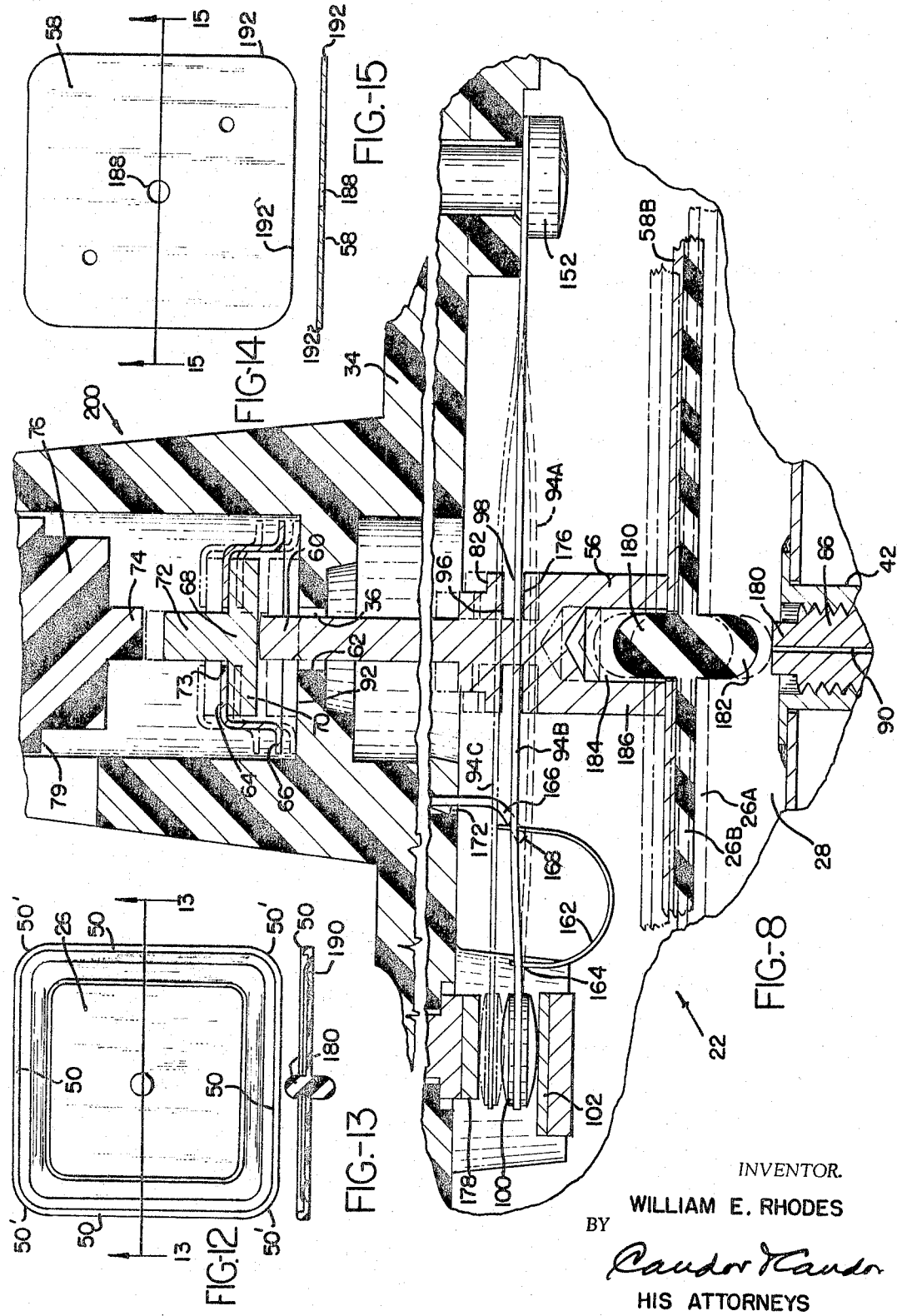

June 13, 1967 W. E. RHODES 3,325,614
FLUID PRESSURE REGULATOR SWITCH
Filed May 24, 1965 4 Sheets-Sheet 4
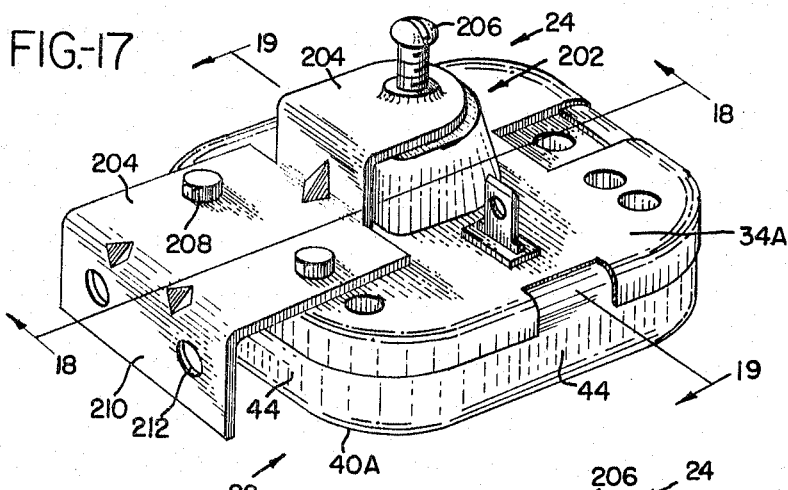
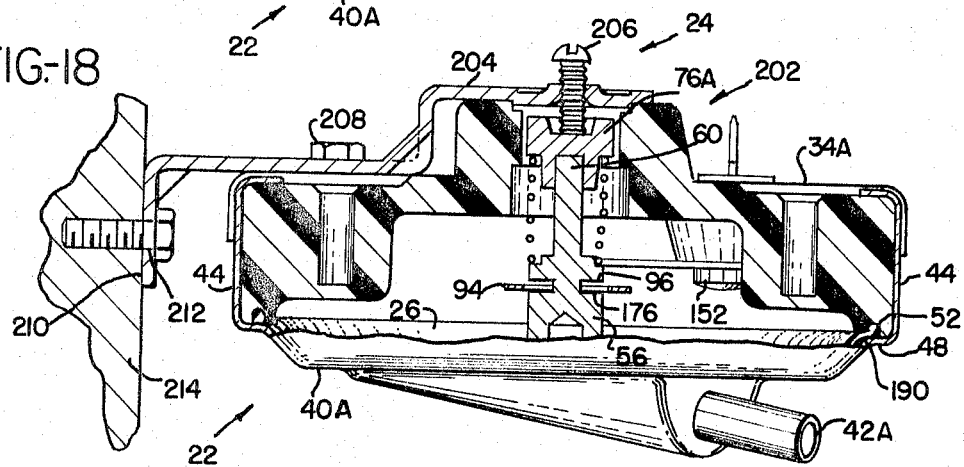
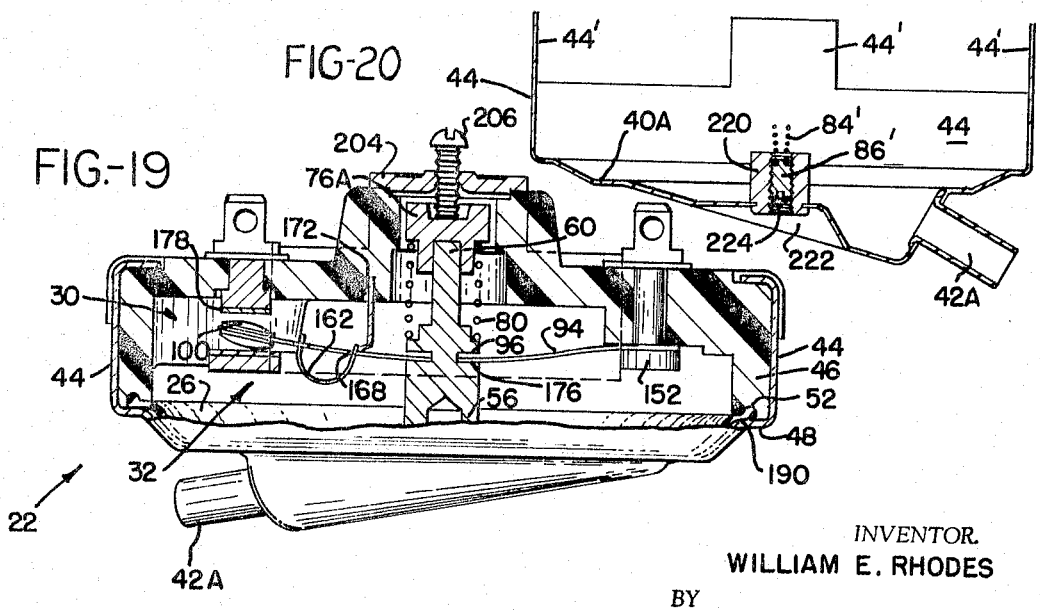
INVENTOR.
WILLIAM E. RHODES
BY
*Candor & Candor*
HIS ATTORNEYS United States Patent Office 3,325,614
Patented June 13, 1967

3,325,614
FLUID PRESSURE REGULATOR SWITCH
William E. Rhodes, Columbus, Ohio, assignor to Robertshaw Controls Company, Richmond, Va., a corporation of Delaware
Filed May 24, 1965, Ser. No. 458,227
20 Claims. (Cl. 200—83)

One of the features of this invention includes the use of a variable relatively high pressure control spring effective to determine the relatively high variable high fluid pressure to which the controller is responsive, an intermediate spring effective to determine the relatively low pressure at which the controller is reset by a relatively low fluid pressure and a third spring effective to adjust the responsiveness of the intermediate spring, such third spring being adjustable independently of the other two springs.

Another feature of this invention includes a construction in which the relatively high variable pressure control spring is adjusted by an adjustment member that has a manual reset adjustment means effective to reset the controller while relatively high fluid pressure is acting on the controller.

Another feature of this invention includes the use of a controller casing that is rectangular in transverse cross section, such as a square transverse cross section, the casing being constructed so that opposite casing members may be assembled and disassembled repeatedly without harm to the caing parts, or to the edge of the diaphragm which is engaged by such casing parts.

Another feature of this invention includes a construction in which the general arrangement of parts may be used in a controller which has a plurality of pressure adjustments by the user of the device, or which may be constructed so that it need not be adjustable to a plurality of variable pressures by the user, but which may be calibrated at the factory or by the serviceman in a simple manner for use as a single pressure responsive device.

Other features of this invention are apparent from this description, the appended claimed subject matter, and/or the accompanying drawings in which:

FIGURE 1 is a top perspective view of an assembled switch multiple pressure construction according to this invention.

FIGURE 2 is an upward view of the upper casing construction of FIGURE 1.

FIGURE 3 is a cross section along the line 3—3 of FIGURE 2.

FIGURE 3A is a cross section of the lower casing construction of FIGURE 1 which telescopes upwardly against the construction of FIGURE 3.

FIGURE 4 is a vertical cross section of an upper portion of the switch construction taken along the line 4—4 of FIGURE 1 and arbitrarily discontinued along the bottom line of FIGURE 4.

FIGURE 5 is a vertical cross section of a lower portion of the switch construction taken along the line 5—5 of FIGURE 1 and arbitrarily discontinued along the top line of FIGURE 5, FIGURES 4 and 5 being vertically coaxial but relatively rotated 90° about such coaxis to show the cooperation of the main parts of the switch construction.

FIGURES 6 and 7 are views similar to FIGURES 4 and 5 respectively with the diaphragm and switch parts in different vertical positions.

FIGURE 8 is an enlarged vertical cross section, taken along line 8—8 of FIGURE 1, of certain parts of the members shown in FIGURES 4-7 with such parts shown in full lines just before the snap up action of the switch takes place, and with upper dash lines showing certain parts in actuated position or top position just after the snap up action, with lower dash lines showing certain parts in reset position or lowermost position, and with the spring coils being omitted.

FIGURE 9 is a broken plan view of the switch snap contact blade and including the C snap spring and the C-spring fulcrum piece.

FIGURE 10 is a cross section along the line 10—10 of FIGURE 1.

FIGURE 11 is an enlarged perspective of the C-spring stationary fulcrum piece.

FIGURE 12 is a plan view of the diaphragm.

FIGURE 13 is a cross section of FIGURE 12 along line 13—13 of FIGURE 12.

FIGURE 14 is a plan view of the rigid plate for the diaphragm.

FIGURE 15 is a cross section along line 15—15 of FIGURE 14.

FIGURE 16 is a cross section showing a combined high pressure adjusting and resetting cam and taken along the line 16—16 of FIGURE 1.

FIGURE 17 is a top perspective view of a single upper level switch construction with service calibration only.

FIGURE 18 is a vertical cross section along line 18—18 of FIGURE 17.

FIGURE 19 is a vertical cross section along the line 19—19 of FIGURE 17.

FIGURE 20 is a cross section of a portion of the lower part of the casing of FIGURES 17-19 showing an adjustment means for the lower adjustment screw.

Certain words are used in the specification and claimed subject matter of this application which indicate direction, relative position, etc. These words are used for the sake of brevity and clearness. However, it is to be understood that these words are used only in connection with the direction, relative position, etc., which are shown in the drawings, and that in actual use, the parts of the actual embodiment may have entirely different direction, relative positions, etc. Examples of these words are "upper," "lower," "vertical," "horizontal," etc.

Certain other words, such as "relatively high pressure" and "relatively low pressure," and the like are used to describe pressures that are relatively high with respect to pressures that are relatively low with respect to each other. Such words are not intended to relate to any fixed datum or datum plane. That is, the controller of this invention is capable of controlling relatively high pressure limits and relatively low pressure limits with respect to each other without being limited to any specific pressure per square inch datum, since it may operate at many and widely different such datums.

A controller according to this invention is made responsive to a variable fluid pressure or to a variable fluid pressure differential, in such a manner that it actuates an energy controller, so that the controlled energy is turned on or off in response to such fluid pressure conditions. For example, the controller may operate a switch construction in such a manner that electric energy is turned on and off in response to such fluid pressures.

The controller of this invention may be used to control various apparatus wherein fluid pressures are to be maintained at relatively high pressure limits and relatively low pressure limits. For example, the controller may be connected to an automatic washing machine in which the tub is to be filled to a desired liquid upper limit and is to be emptied completely of such liquid or is to be only partially emptied, as desired. The operator may adjust the controller to select any one of several upper liquid limits and the controller responds by causing the tub to be filled to such selected upper limit. If the operator should then desire to fill the tub further to a higher upper level limit he or she may "manually reset" the controller, independently of the already relatively high level in the tub to cause the controller to produce a further filling action of the tub to the newly selected upper level.

A customer or user manual adjustment knob or lever is provided by which such user may adjust the spring load of an upper spring to obtain the desired one of a plurality of selectable upper pressure limits. Also according to another embodiment, the factory or service man may select a desired upper level limit by adjusting a screw which the customer or user is not ordinarily expected to adjust, the controller thus having only one customer upper level control.

The controller is also capable of controlling the relatively low pressure at which the controller will "pressure reset" or turn off, or the like, in response to a selected relatively low pressure or water level in the tub. Such "pressure reset" action generally takes place when the tub or the like has been emptied completely or partially, as may be established by an intermediate spring which causes the main "pressure resetting" action in response to such relatively low pressure in the controller. In addition, a third or lower adjusting spring is provided with means for adjusting its spring load from outside the casing of the controller. This provides an adjustable "pressure reset" available for adjustment from outside the casing to establish the relatively low pressure at which the controller will "pressure reset."

A factory or customer adjustable screw is provided by which the spring load of the third or lower spring is adjusted to establish a desired "low pressure reset."

FIGURES 4 and 5 have been positioned with respect to each other, so that the important parts of FIGURE 4 are aligned with the important parts of FIGURE 5 in such a manner that the operations of the parts of FIGURE 4 and of the parts of FIGURE 5 can be more readily understood because of the alignment of parts. It is to be noted that FIGURE 4 is taken along the line 4—4 of FIGURE 1 whereas FIGURE 5 is taken at right angles thereto, along the line 5—5 of FIGURE 1. However, by so aligning FIGURES 4 and 5, it is very readily understood how the operating parts of FIGURE 4 will effect the operations of the parts of FIGURE 5.

FIGURES 6 and 7 are related to each other in the same manner as the relation of FIGURES 4 and 5 are to each other.

It is also to be noted that FIGURE 8 shows certain parts of FIGURES 4–7 in enlarged form. However, the spring structures have been omitted, to avoid cluttering the FIGURE 8 to the point where the dotted line positions would not be readily understood. In FIGURE 8, the dotted lines below the full lines show the reset position of the parts. The full lines positions of FIGURE 8 show the parts just before the contact carrying spring blade is snapped up by the upward movement of the plunger. The dotted lines above the full lines indicate the parts after the snap up has been completed.

To this end, the controller may have a casing 20, as indicated in FIGURES 1, 4, 5, 6, and 7. Such casing 20 may have a variable pressure fluid bottom connection means or casing bottom member 22 and a constant or different pressure fluid upper connection means or casing upper member 24.

A diaphragm 26 in the casing 20 may separate the interior of the casing into a variable pressure lower chamber 28 and into a constant, or different upper pressure chamber 30.

An energy controller, such as a switch 32 may be placed in the casing 22 to be operated by vertical movement of the diaphragm 26 in response to variable fluid pressures in the lower chamber 28 and to constant or different fluid pressures in the upper chamber 30.

By way of example, the casing 20 may be made of two parts, such as an upper dome shaped, or inverted cup shaped electrically insulative material casing part 34, which may form the constant pressure fluid upper connection means 24. This means 24 may be so constructed that the upper chamber is connected to the outside atmosphere, such as through the intermediate opening 36 and the top opening 38, FIGURES 4 and 6, so that the chamber 30 is normally maintained at constant atmospheric pressure or a different pressure from the pressure of chamber 28.

A cup shaped lower casing part 40, FIGURE 3A, which may be metallic, if desired, may have a variable fluid pressure connector 42 which may be in the shape of a tube or the like. The vertical cup rim 44 engages and telescopes with the vertical inverted cup ring 46 of the inverted cup 34 of the upper casing part, as is indicated by the axially aligned FIGURES 3 and 3A.

The lower casing part 40, FIGURES 5 and 7, has a shoulder or horizontal shelf 48, adjacent the rim 44, which engages the edge 50 of the diaphragm 26 and secures it against or in a groove 52 at the lower edge of the rim 46 of the upper casing part 44.

A plunger 54, FIGURES 5–8, may have a lower end 56 effective on or engaging the diaphragm 26, through the medium of a relatively rigid flat plate 58.

The plunger 54 may have an upper end 60 which may extend into the upper connection means or casing part 34, through the opening 36. A stationary partition 62 may be placed in the upper connection means 34, which forms the plunger opening 36 into which the upper end 60 of the plunger is movable, such end of the plunger being capable of extending completely through the opening 36, as shown in FIGURES 6–8.

A spring end receiving inverted cup 64 may have a lower rim 66, which is supportable on the stationary partition 62, to place said inverted cup 64 over the plunger opening 36.

A reset button 68 is located in the inverted cup 64 which is effective during the manual resetting operation. The button 68 may be in the form of a horizontal plate or disc 70, which is engageable by the upper end 60 of the plunger, as shown in FIGURES 7 and 8, in full lines in FIGURE 8. The plate or disc 70 is engageable with the stationary partition 62, as shown in FIGURE 4, and as shown in dotted lines in FIGURE 8.

The button 68 also has an upward button shaft 72, which extends through an opening 73, FIGURE 8, in the inverted bottom of the inverted cup 64. As will become later apparent, the button shaft 72 may be engaged by the downward dimple 74, when a manual resetting operation is to be performed by the upper adjustment member 76.

A relatively high variable pressure upper control spring 78 is placed above the inverted cup 64 with its lower end engaging the rim 66 of the cup 64, FIGURES 4 and 6, and with the adjustment member 76 engaging the upper end of the control spring 78, at the shoulder 82, as shown in FIGURE 4. Under certain manual reset conditions elsewhere described, the adjustment member 76 may be pushed down, to force the dimple 74 down a sufficient distance to force the upper end 60 of the plunger 54 completely down, to force the diaphragm 26 to the reset position, where the switch 32 is placed in the reset position shown in FIGURE 5 even if there is a relatively high fluid pressure in chamber 28, in a manner elsewhere described.

An intetermdiate spring 80, FIGURES 4–7, is placed above the diaphragm 26 with its upper spring end effective on or engaging the stationary partition 62 and with its lower spring end effective on or engaging a shoulder 82, FIGURE 5, on plunger.

A reset adjustment lower spring 84, FIGURES 5 and 7, has its upper end engaging or is effective on the diaphragm 26. The lower end of the spring 84 engages or is effective on lower spring adjustment member 86. The adjustment member 86 may be a threaded screw member, threaded at 88 which may be adjusted vertically by inserting a screwdriver at the lower end of the tubular connector 42 to engage the slot 89. This may be done while such connector is not connected to the well known supply tube which leads to the washing machine tub.

The spring adjustment member or screw 86 has a fluid passageway 90 through which pressure fluid may enter or leave the lower chamber 28.

The connector 42 may be connected by a flexible tube to the bottom of a washing machine tub, for example, in such a manner that the air trapped in the lower chamber 28 is subjected to variable pressures produced by air flowing in and out through the passage 90, such air being varied in pressure by the height of the water level in the tub, in a manner well known to the art.

The upper adjustment member 76 may be manually adjusted to impose various spring loads on the spring 78, to cause the spring 78 to be responsive to various relatively high pressures in the chamber 28. The manual control means may also push the adjustment member 76 sufficiently far down to cause the dimple 74 to engage the top of the upward button shaft 72 and to push it down, thus causing the disc 70 to push the top 60 of the plunger downward as far as the top surface 92 of the stationary partition 62. When this is done, even when the chamber 28 is subjected to high pressure, somewhat as illustrated in FIGURES 6 and 7, the diaphragm 26 will be pushed down against such pressure in chamber 28, to a low position such as shown in FIGURE 5, to push the contact blade 94 down by means of the top surface 96 of the plunger notch 98. The blade 94 snaps the movable contacts 100 down against the stationary contact 102. The stationary contact 102 may be connected to a connector passing through the top wall of the upper casing 34 in a manner not shown, but well known in the art, so that such connector may open the water feed valve construction to feed water into the washing machine tub, for example.

An example of means for vertically adjusting the upper adjustment member 76 is illustrated as representative of many such adjusting devices which may be used. For example, an adjusting lever 104 is pivoted on the fulcrum blade construction 106 which may include two fulcrum blades, if desired, on the vertical arm 108 of a U-shaped bracket 110, which has another vertical arm 112. An adjusting shaft 114 passes through suitable openings 142 and 144 in the arms 108 and 112, in any suitable manner, so that the shaft 114 is longitudinally locked thereon, such as by a spreadable lock washer 116, of well known construction, which holds the shaft 114 against longitudinal movement but allows it to turn freely in both of the openings of the arms 108 and 112. An adjusting cam 118 is longitudinally and rotationally fixed on the shaft 114 in any well known manner such as by keying, welding or the like, to cause the cam 118 to rotate with the shaft.

The cam 118, FIGURE 16, has a spiral surface 120, of gradually increasing radii from the shaft 114 from the lowest pressure position 122 to the highest pressure position 124. A resetting cam surface 126 is provided to produce an extreme additional resetting upward movement on the end 128 of the lever 104.

The other end 130 of the lever 104 is provided with a tapped opening 132, FIGURE 4, through which an adjusting screw 134 passes and engages the adjusting member 76.

Any suitable construction may be used to secure the shaft 114 within the arms 108 and 112. For example, a small diameter groove 136, FIGURE 4, of the shaft 114 may be so placed that the groove 136 can be inserted in the slanting slot 138 in the bracket 112 before the end 140 of the shaft 114 is inserted in the opening 142 of the bracket 108. The shaft 114, with the cam 118 secured thereon can be slantingly moved along the narrow slanting slot 138 until the shaft 114 is aligned with the openings 142 and 144, and then the shaft 114 may be moved rightwardly in FIGURE 4 to insert the end 140 of the shaft 114 in the opening 142 and to insert the wider part of the shaft 114 in the opening 144, after which the lock washer 116 may be snapped over the narrow groove 146 of the shaft 114.

The contact blade 94 is shown in broken plan view in FIGURE 9. The end 148 has an opening 150 to receive the rivet 152, FIGURE 5. The blade 94 has openings 154 and 156. The opening 156 has a notch 158 loosely to receive the narrow joint member 160 of the plunger notch 98. The snap spring 162 engages the square end 164 of opening 156 by suitable well known tongue constructions. The other end of the snap spring 162 engages the fulcrum edges 166, FIGURE 11, on either side of a tongue 168 of the fulcrum piece 170.

The fulcrum piece 170, FIGURE 11, has outward barb-like tongues 172 which are spring biased, so that when the fulcrum piece 170 is pushed in to a proper groove in the horizontal wall of the casing 34, the spring biased tongues lock the fulcrum piece securely in place, without the need of riveting the fulcrum piece to the casing.

The construction is such that when there is no fluid pressure in the chamber 28 or a low fluid pressure, as shown in FIGURE 5, the diaphragm 26 is in its lowermost position, which causes the blade 94 to set the contacts 100 in the lowermost position in response to low pressure in the chamber 28. When this low pressure exists in chamber 28, the compression springs 78 and 80 push the plunger 54 down against the much weaker spring force of the adjusting spring 84.

If the adjusting cam 120 is placed, for example, at a medium position, such as 174, FIGURE 16, to engage the end 128 of the lever 104, and the master switch of the washing machine is turned on, the solenoid water valve of the washing machine, not shown, is opened by the stationary contract 102 and the water in the tub gradually rises and increases the pressure in the chamber 28. The position of the parts of FIGURE 5 are indicated, for example, in FIGURE 8, with the dotted diaphram 26A.

As the inflowing water fills the tub and the pressure in chamber 28 increases, the diaphragm 26 rises gradually until it reaches the full line position 26B of FIGURE 8 which is just before the blade 96 snaps up from the low position 96A, FIGURE 8, of the blade to the full line position 94B of the blade. The blade 94 is moved upwardly by the lower surface 176 of plunger notch 98 to the position 94B. At this point the flexing force of the blade 94B in an upward direction is sufficient to cause the blade end 164 to snap quickly up past the fulcrum point 166 to the actuated position 94C, when the blade 94 then engages the upper surface 96 of the notch 98. When the contacts 100 leave the lower stationary contacts 102, and engage the upper stationary contact 178, the filling action of the tub is stopped, because the water valve is closed, and other washing operations of the washing machine are then initiated through the contact 178 which carries the electrical energy to certain other parts of the washing machine.

However, should the operator of the washing machine decide at this time that the amount of water in the tub is not sufficient, the operator may move the cam 120, FIGURE 16, clockwise to a greater pressure position, such as 178. However, no filling action would be produced, because there is nothing to push the blade 94 downward against the action of the snap spring 162, once the blade has reached the position 94C in FIGURE 8.

However, the operator may produce a manual reset action which forcibly pushes the plunger 54 down, so that the diaphragm 26 is pushed back to the substantially its lowest position of FIGURE 5 in spite of a high pressure in the chamber 28. This is done by turning the cam 118 clockwise, FIGURE 16, so that the manual reset cam surface 126 produces a strong lifting pressure on the end 128 of the lever 104, FIGURE 4, and that pushes the upper adjusment member 76 downward in a manner to cause the dimple 74 to contact the button shaft 72 and thus produce a downward movement of the plunger 54 to push all of the parts down to their lowest motion reset position. This causes the contact 100 to be moved against the contact 102 and start the filling action in the tub. The user may then turn the cam 118 counterclockwise to any position above the original medium position 174, such as by returning it to position 178, so that the position 178 is under the end 128 of the lever 104, and then the filling action continues until the tub is filled to the higher level, as established by the position 178 of the cam.

There is also a low pressure resetting action which takes place when the tub is being emptied, so that the presure in chamber 28 falls sufficiently to cause the diaphragm 26 to be lowered by atmospheric pressure above the diaphragm in combination with the springs 78 and 80 acting against the weaker spring 84. The spring 78 pushes the inverted cup 64 down until the rim 68 of the cup engages the stationary partition 62. Then the intermediate spring 80 continues to push the plunger 54 downward against the weaker action of the spring 84, until a position of the diaphragm is reached which need not be completely down against the upper end 180 of the screw 86. This is desirable under certain washing conditions to have the tub not quite completely emptied, after which the downward snap of the blade starts a refill of the tub because of such resetting action.

The adjusting spring 84 may have its spring load varied by adjustment of the screw 86, and thus the spring 84 can be used to calibrate the controller, to provide whatever pressure resetting action is desired. Vertical adjustment of screw 86 calibrates the pressure in the chamber 28 at which the low pressure reset takes place. This is a very important function of the spring 84 and of the adjusting screw 86, because the reset adjustment or calibration may be performed from outside the controller, merely by inserting a screw driver through connector 42 into screw driver notch 89, and then turning the screw.

The foregoing actions are described under conditions wherein the pressures in the chamber 28 are generally above atmospheric pressure, and the pressure in chamber 30 is atmospheric, and this action takes place as long as the spring 84 is weaker than the intermediate spring 80.

However, if it is desired to make the controller responsive to vacuum pressures in the chamber 28, the spring 84 may be made stronger than the spring 80. This causes the spring 84 to hold the entire switch construction up in the actuated position as long as there is atmospheric pressure on both sides of the diaphragm.

Thereafter when a vacuum is imposed in the chamber 28, then the atmospheric pressure in the chamber 30 in combination with the weaker spring pressure from intermediate spring 80, will combine sufficiently to move the diaphragm 26 down. Under these conditions, for example, the upper stationary contact 178 may energize a vacuum pump or the like, and when a sufficient vacuum is produced by such pump in chamber 28, the contacts 100 are moved away from the stationary contact 178 to the lower position, which stop the action of the vacuum pump to maintain a desired vacuum pressure between selected limits.

The pressure controller may be made into rectangular or square transverse cross sections. Under these conditions the upper casing member 34 may have four vertical side walls 46, FIGURE 2, to produce a substantially square enclosure, with only slightly rounded corners. The diaphragm 26 may have a substantially square or rectangular cross section perimeter as shown in FIGURE 12.

In the case of the square cross section, the diaphragm 26 may have four straight sided beads 50, FIGURE 12, at the edge of the diaphragm, which are connected with rounded bead corners 50'.

If desired, the diaphragm 26 may be provided with a central upward bead or button 180 and a downward central bead or button 182. The purpose of the upper bead 180 is to receive the opening 184, FIGURE 8, in the lower end 186 of the plunger 54. The upper bead 180 also receives the opening 188, FIGURE 14, of the rigid flat plate 58. The upper bead 180 therefore holds the lower end 186 of the plunger 54 and holds the flat plate 58 against sidewise displacement and centers these members with respect to the plunger 54.

The lower bead 182 of diaphragm 26 receives the upper portion of the lower spring 84, FIGURE 5, and centers the upper end of the spring 84 with respect to the diaphragm 26. Also, the downward bead 182 is used to limit the downward movement of the diaphragm 26, as the bear 182 engages or is effective on the upper end of the adjusting member or screw 86.

The diaphragm 26 may also be provided with a substantially square corrugation 190, to permit ready flexing of the diaphragm, as it is moved upward and downward by the varying pressures in the chamber 28.

The rigid plate 58 may be provided with four straight sides 192, FIGURE 14, which extend to a position adjacent the corrugated portion 190 of the diaphragm.

The lower cup-shaped casing part 40, FIGURE 3A, may have four vertical cup rims 44, which telescope around the corresponding lower recesses 46' on the four vertical cup rims 46 of the upper casing 34. The four vertical rims 44 may have four tongues 44', which curl around the top edge of flat side of the upper casing 34, and extend into vertical and horizontal slots 34' in the upper casing 34, as indicated in FIGURE 5.

An advantage of the square cross section of the casing 20 is that the two parts of the casing may be disassembled merely by straightening out the tongues 44' sufficiently, so that the lower casing part 44 may be pulled off downwardly from the upper part 34. This is an advantage as compared to the usual circular casing, where the crimped circular edge of the lower part of a casing is practically destroyed, if it is attempted to straighten out the completely circular crimped upper edge of such circular casing to disassemble the casing.

This advantage is obtained because the set of four vertical side walls 44 of the lower casing part 40 have the tongue extensions 44' extending vertically along the four vertical side walls 46 of the upper set of side walls of the upper casing part with the four ends of the tongues 44' extending upwardly and being bent over the edges of the four vertical side walls 46.

Another advantage of the rectangular or square cross section construction is that the various parts of the pressure controller may have a lower casing part 40, as shown in FIGURES 1–16 or as shown at 40A in FIGURES 17–19, alternatively usable with an upper casing part 34, as shown in FIGURES 1–16, which have a relatively long upper casing member 200, as indicated in FIGURES 1, 4, and 6. Alternatively said lower casing member 40 or 40A can be used with a relatively short upper casing member 202, as shown in FIGURES 17–19. The relatively long upper casing member 200 may be provided with a variable high pressure selector, such as cam 118, as shown in FIGURES 1, 4 and 6, and with a reset actuator, as shown at 126 in FIGURE 16. The relatively short upper casing member 202 may have a stationary arm or bracket 204 with a factory or service adjusting screw 206.

It is therefore obvious that any of the two upper casing parts 200 of FIGURES 1–16 and 202 of FIGURES 17–19 may be used interchangeably with any of the lower casing parts 40 of FIGURES 1–16, or with the lower casing parts 40A of FIGURES 17–19.

It is therefore obvious that the general design and construction of the parts may be alternatively used for either construction, wherein the customer may have a choice of a large number of pressure adjustments, as disclosed in FIGURES 1–16, along with the factory or service adjustment screw 134 of these parts, or the customer may be provided with a construction which normally is not adjustable by the user, but is factory or service adjustable by means of the screw 206.

The bracket 204 may be bolted as indicated with bolts 208 to the upper casing member 34A. The bracket 204 may have a downward flange 210, which may be provided with openings 212, so that the embodiment of FIGURES 17–19 may be bolted to any desired support member 214, as indicated in FIGURE 18.

The upper adjustment member 76A of FIGURES 17–19 may be substantially the same as the adjusting member 76 of FIGURES 1–16. The switch parts of FIGURES 17–19 may be substantially the same as those of FIGURES 1–16 and the diaphragm of FIGURES 17–19 may be substantially the same as the diaphragm 26 of FIGURES 1–16.

The lower casing member 40A of FIGURES 17–19 may have a vertical connector, such as is shown at 42 in FIGURES 1–16, but not shown in FIGURES 17–19, or it may have a slanting connector 42A which is slanting for the purpose of reducing the vertical height of the controller. The vertical connector 42 of FIGURES 1–16, or the slanting connector 42A of FIGURES 17–19 may be interchangeably used with the embodiments of FIGURES 1–16 or of FIGURES 17–19, as desired.

The slanting connector member 42A may be at an obtuse angle with respect to the central verticle axis of the chambers of the controller.

A vertical adjustment for the adjusting screw 86' for the lower spring 84' of the slanting connector construction of FIGURES 17–19 is shown in FIGURE 20.

A bushing 220 is secured and sealed in a countersunk notch 222 in the bottom member 40A. The bushing 220 is internally threaded and receives the adjusting screw 86' which may be substantially the same as the adjusting screw 86 of previous embodiments, except that the passageway 90 of previous embodiments is omitted. The screw 86' may be adjusted vertically to vary the spring load in lower spring 84'. The lower end of screw 86' may be sealed after calibration by any suitable sealant 224, which may be inserted in the bushing.

The slanting connector 42A and its adjustment means of FIGURE 20 may be used with the embodiments of FIGURES 1–16 as well as with the embodiments of FIGURES 17–19.

Any well known adjusting means may be used to adjust the upper adjustment member 76 or the lower adjustment member 86. For example, any well known multiple belt and valley cam may be used in which the hills are used to produce the manual resetting of the switch and valleys of different depths are used to provide the various relatively high pressure selections.

It is thus to be seen that a new and useful energy controller has been provided by this invention.

While the form of the invention now preferred has been disclosed as required by the statutes, other forms may be used, all coming within the scope of the claims which follows.

What is claimed is:

1. In combination:
  a casing having a variable pressure fluid bottom connection means and a constant pressure fluid upper connection means;
  a diaphragm in said casing separating the interior of said casing into a variable pressure lower chamber and a constant pressure upper chamber;
  a plunger with a lower end engaging said diaphragm and having an upper end extending into said upper connection means;
  a switch in said casing operated by vertical movement of said diaphragm in response to the flexing of said diaphragm by variable fluid pressures in said lower chamber;
  a stationary partition in said upper connection means having a plunger opening into which said upper end of said plunger is movable;
  a spring end receiving inverted cup having a lower rim supportable on said stationary partition to place said inverted cup over said plunger opening;
  a reset button in said inverted cup having a horizontal plate engageable with said upper plunger end and with said stationary partition, said plate having an upward button shaft extending through an opening in the inverted bottom of said inverted cup;
  a relatively high variable pressure upper control spring above said inverted cup with its lower end engaging said rim of said cup;
  an upper end adjustment member with relatively high variable fluid pressure adjustment means and a reset adjustment means, said adjustment member engaging the upper end of said upper control spring and engaging said button shaft when adjusted to render said reset adjustment means effective;
  an intermediate spring above said diaphragm with its upper end engaging said stationary partition and with its lower end engaging a spring receiving shoulder on said plunger;
  a reset adjustment lower spring below said diaphragm with its upper end engaging said diaphragm;
  a low spring adjustment member engaging the lower end of said lower spring, said reset adjustment member being adjustable to vary the spring load on said lower spring.

2. A combination according to claim 1 in which said lower spring adjustment member is adjustable through said bottom connection means.

3. In combination:
  a casing having a variable pressure fluid bottom connector and a high pressure adjustment upper extension;
  a diaphragm in said casing separating the interior of said casing into a variable fluid pressure lower chamber and a constant fluid pressure upper chamber;
  a plunger moved by said diaphragm and extending into said upper extension;
  a switch in said upper chamber and operated by said plunger to an actuated position and a reset position in response to the flexing of said diaphragm by variable fluid pressures in said lower chamber, said switch being moved to said actuated position in response to a selected relatively high variable fluid pressure and moved to said reset position in response to a relatively low variable fluid pressure;
  a stationary partition in said upper connector having a plunger receiving opening;
  a relatively high variable pressure control spring in said upper extension having an upper end adjustment member with relatively high variable pressure selection means and having a lower end adjustment member engaging said stationary partition and being upwardly movable from said stationary partition by said plunger;
  an intermediate spring in said upper chamber having an upper end arrested by said stationary partition and a lower end engaging said plunger;
  and a reset adjustment spring in said lower chamber having an upper end upwardly engaging said diaphragm and having a lower end with spring load adjusting means adjustable through said bottom connector.

4. A combination according to claim 3 in which said upper end adjustment member has a manual resetting means engaging said plunger to reset said switch while said lower chamber is at a relatively high pressure.

5. In combination:
  a casing having a diaphragm separating said casing into a variable fluid pressure lower chamber and a different fluid pressure upper chamber;
  a variable pressure fluid connector for said lower chamber;
  a switch in one of said chambers operated by said diaphragm to an actuated position in response to relatively high variable fluid pressures in said lower chamber and to a reset position in response to relatively low variable fluid pressures in said lower chamber;
  a relatively high variable pressure upper control spring above said diaphragm and having an upper end adjustment member with relatively high variable fluid pressure selection means and having a lower end adjustment member engaging said diaphragm at said relatively high variable fluid pressures but not engaging said diaphragm at lower variable fluid pressures;

an intermediate spring in said upper chamber downwardly engaging said diaphragm to cause said diaphragm to move said switch to reset position at a selected relatively low fluid pressure;

and a reset adjustment lower spring in said lower chamber effective partially to counterbalance the effect of said intermediate spring on said diaphragm and having spring load adjustment means adjustable at the lower end of said casing.

6. A combination according to claim 5 in which said casing is substantially square in horizontal cross section.

7. A combination according to claim 5 in which said upper control spring is located in a high pressure adjustment upper casing portion.

8. A combination according to claim 7 in which said upper casing portion has a stationary partition and said lower end adjustment member is an inverted cup with its rim holding said lower end of said upper control spring.

9. A combination according to claim 8 in which a disc with an upward shaft on one side is located in said inverted cup with said shaft extending through an opening in the inverted bottom of said inverted cup.

10. A combination according to claim 8 in which said stationary partition has a plunger receiving opening, and in which a plunger has an upper end which is moved vertically by said diaphragm through said opening and vertically moves said inverted cup upwardly off said stationary partition in response to a selected relatively high variable fluid pressure in said lower chamber.

11. A combination according to claim 10 in which said intermediate spring has its upper end engaging said stationary partition and has its lower end engaging said plunger above said diaphragm.

12. A combination according to claim 11 in which said lower spring has an upper end acting upwardly on said diaphragm and has a lower end engaging a vertically adjustable reset adjustment member.

13. A combination according to claim 12 in which said casing has an inverted cup shaped casing member forming said upper chamber and a lower cup shaped casing member forming said lower chamber.

14. A combination according to claim 13 in which said cup shaped casing member holds and seals the perimeter of said diaphragm against the lower edge of said inverted cup shaped casing member.

15. A combination according to claim 14 in which said cup shaped casing member has a downwardly extending variable pressure fluid conduit.

16. A combination according to claim 5 in which said upper control spring is located in a high pressure adjustment upper casing portion and in which said upper casing portion has a stationary partition and said lower end adjustment member is an inverted cup with its rim holding said lower end of said upper control spring and in which said stationary partition has a plunger receiving opening, and in which a plunger has an upper end which is moved vertically by said diaphragm through said opening and vertically moves said inverted cup upwardly off said stationary partition in response to a selected relatively high variable fluid pressure in said lower chamber and in which said intermediate spring has its upper end engaging said stationary partition and has its lower end engaging said plunger above said diaphragm and in which said lower spring has an upper end acting upwardly on said diaphragm and has a lower end engaging a vertically adjustable reset adjustment member and in which said casing has an upper inverted cup shaped casing member forming said upper chamber and a lower cup shaped casing member forming said lower chamber and in which said cup shaped casing member holds and seals the perimeter of said diaphragm against the lower edge of said inverted cup shaped casing member and in which said cup shaped casing member has a downwardly extending variable pressure fluid conduit and in which said vertically adjustable reset adjustment member is a vertically adjustable screw adjustable through said variable pressure fluid conduit.

17. A combination according to claim 16 in which said casing is substantially square in cross section and has mainly flat upper and lower horizontal end walls.

18. A combination according to claim 17 in which said diaphragm is substantially square in cross section and has central upward and downward beads, and in which a rigid plate has an opening to receive said central upward bead, and in which a plunger has a lower end engaging said rigid plate, said lower plunger end having an axial opening receiving said central upward bead, said plunger actuating said switch.

19. In combination:
a controller casing;
a substantially rectangular transverse cross-sectioned inverted cup shaped upper casing member having four upper casing vertical side walls with a substantially rectangular lower rim;
a substantially rectangular transverse cross-sectioned diaphragm with its perimeter engaging said lower rim;
a substantially rectangular transverse cross-sectioned cup shaped lower casing member having four lower casing vertical side walls removably telescoped with said four upper casing vertical side walls;
a switch mounted in the space enclosed by said upper and lower casing members; and means connected to the diaphragm responsive to variable fluid pressures on one side of the diaphragm for moving the switch to actuated and reset positions.

20. A combination according to claim 19 in which said inverted cup shaped member, said lower rim, said diaphragm, and said lower casing member are square cross sectioned.

References Cited
UNITED STATES PATENTS

| | | | |
|---|---|---|---|
| 2,327,069 | 8/1943 | Satterlee | 200—83 |
| 3,135,849 | 6/1964 | Kuhn | 200—140 |
| 3,209,094 | 9/1965 | Bauer | 200—83 |

BERNARD A. GILHEANY, *Primary Examiner.*

H. B. GILSON, G. MAIER, *Assistant Examiners.*